US012657473B2

(12) United States Patent　　　(10) Patent No.:　US 12,657,473 B2
Tu et al.　　　　　　　　　　　　(45) Date of Patent:　Jun. 16, 2026

(54) RECOMMENDATION METHOD, APPARATUS, ELECTRONIC DEVICE, AND STORAGE MEDIUM

(71) Applicant: ZTE CORPORATION, Shenzhen (CN)

(72) Inventors: Yaofeng Tu, Shenzhen (CN); Jin Xu, Shenzhen (CN); Dezheng Wang, Shenzhen (CN); Sen Fan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 591 days.

(21) Appl. No.: 18/253,966

(22) PCT Filed: Nov. 17, 2021

(86) PCT No.: PCT/CN2021/131161
　　　§ 371 (c)(1),
　　　(2) Date: May 23, 2023

(87) PCT Pub. No.: WO2022/105780
　　　PCT Pub. Date: May 27, 2022

(65) Prior Publication Data
　　　US 2024/0005170 A1　　Jan. 4, 2024

(30) Foreign Application Priority Data

Nov. 23, 2020　(CN) .......................... 202011321668.8

(51) Int. Cl.
　　　*G06N 3/092*　　　(2023.01)
(52) U.S. Cl.
　　　CPC .................................... *G06N 3/092* (2023.01)

(58) Field of Classification Search
None
See application file for complete search history.

(56) References Cited

U.S. PATENT DOCUMENTS 8,090,621 B1 * 1/2012 Chakrabarti ....... G06Q 30/0601
　　　　　　　　　　　　　　　　　　705/26.1
2010/0275218 A1 * 10/2010 Young ................... G06F 3/0238
　　　　　　　　　　　　　　　　　　726/1

(Continued)

FOREIGN PATENT DOCUMENTS

CN　　　109274456 A　　1/2019
CN　　　109719721 A　　5/2019

(Continued)

OTHER PUBLICATIONS

International Search Report and Written Opinion issued in International Application No. PCT/CN2021/131161; mailed Feb. 14, 2022; 12 pgs.

(Continued)

*Primary Examiner* — Hasanul Mobin

(74) *Attorney, Agent, or Firm* — HAUPTMAN HAM, LLP

(57)　　　　　　ABSTRACT

Disclosed are a recommendation method, an apparatus, an electronic device, and a storage medium. The recommendation method includes: generating an item recommendation rank for a user based on a policy network in response to a user request at moment t; obtaining an experience at the moment t based on a feedback result from the user on the item recommendation rank; aggregating the experience of each user at the moment t to a global experience pool; and obtaining an updated policy network based on experiences in the global experience pool.

7 Claims, 9 Drawing Sheets

(56)         References Cited

U.S. PATENT DOCUMENTS

| | | | |
|---|---|---|---|
| 2016/0034460 A1* | 2/2016 | Ding | G06N 20/00 |
| | | | 706/12 |
| 2016/0125048 A1* | 5/2016 | Hamada | G06F 16/24578 |
| | | | 707/734 |
| 2018/0165745 A1* | 6/2018 | Zhu | G06Q 30/0631 |
| 2019/0138880 A1* | 5/2019 | Akella | G05B 19/4183 |
| 2019/0384257 A1* | 12/2019 | Zhang | G06F 11/008 |
| 2020/0090048 A1 | 3/2020 | Pascanu et al. | |
| 2020/0265305 A1 | 8/2020 | Budden et al. | |
| 2020/0279162 A1 | 9/2020 | Sunehag | |
| 2021/0118073 A1* | 4/2021 | Brisimi | G06N 3/0464 |
| 2021/0182938 A1* | 6/2021 | Kamimaeda | G06Q 30/0631 |
| 2023/0185863 A1* | 6/2023 | Yadav | G06F 16/9535 |
| | | | 707/706 |

FOREIGN PATENT DOCUMENTS

| | | | | | |
|---|---|---|---|---|---|
| CN | 110111152 | A | | 8/2019 | |
| CN | 110430471 | A | | 11/2019 | |
| CN | 110851699 | A | | 2/2020 | |
| CN | 111104595 | A | * | 5/2020 | ......... G06F 16/9535 |
| CN | 111800331 | A | | 10/2020 | |
| CN | 111859114 | A | | 10/2020 | |
| JP | 2019028899 | A | | 2/2019 | |
| JP | 2019144950 | A | | 8/2019 | |

OTHER PUBLICATIONS

First Office Action in Corresponding Japanese Application No. 2023-531066, dated Aug. 23, 2024; 13 pgs.

Eugene IE et al., "Slateq: A Tractable Decomposition for Reinforcement Learning with Recommendation Sets", Proceedings of the Twenty-Eighth International Joint Conference on Artificial Intelligence (IJCAI-19); dated Aug. 16, 2019; 9 pgs.

First Office Action in Corresponding Chinese Application No. 202011321668.8, dated Jun. 13, 2025; 20 pgs.

Lewis et al., "Front and War Applications in Deep Reinforcement Learning", Machine Industry Press, dated Jun. 30, 2020, pp. 153-159; 15 pgs.

* cited by examiner

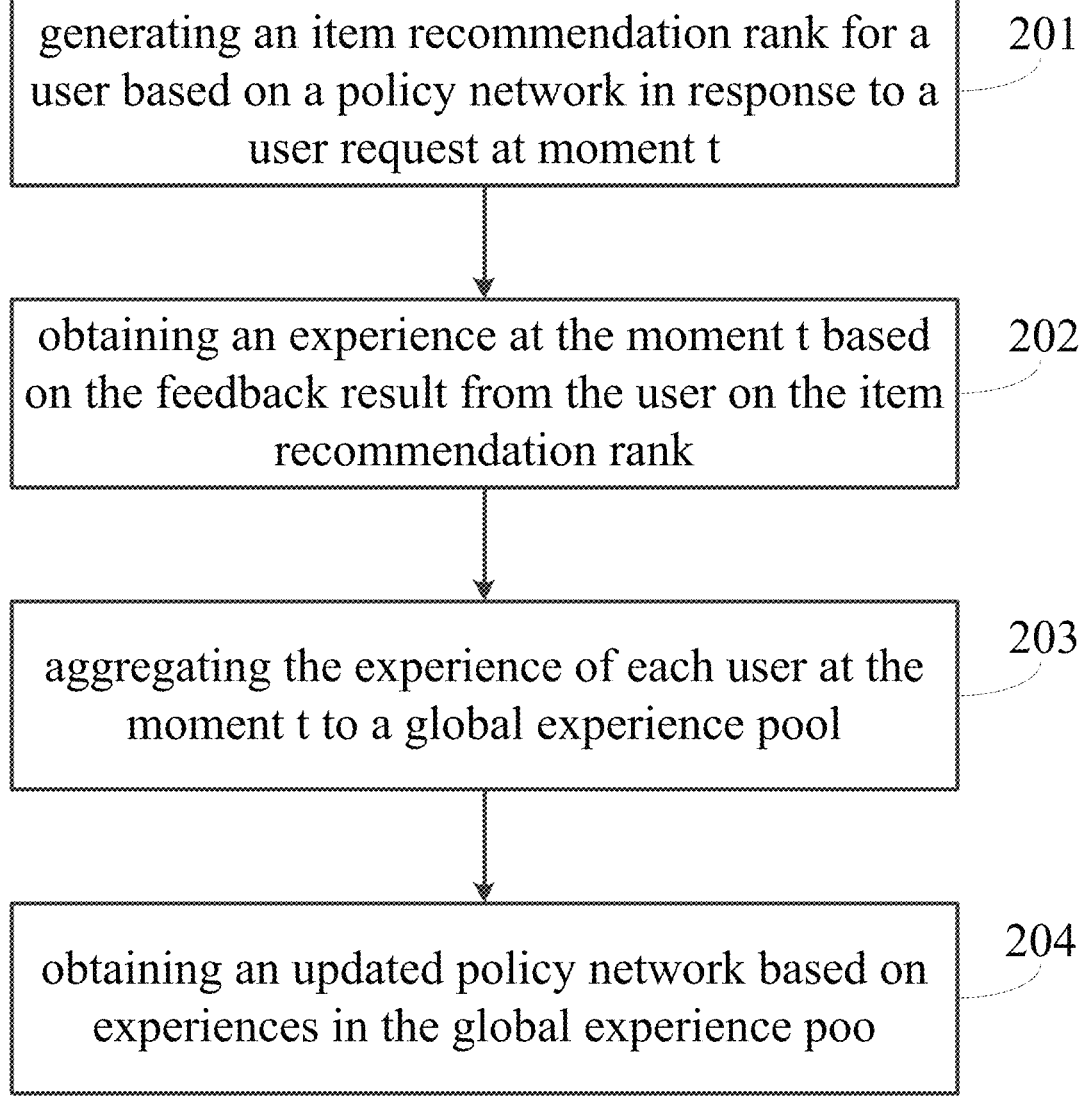

generating an item recommendation rank for a user based on a policy network in response to a user request at moment t — 201 obtaining an experience at the moment t based on the feedback result from the user on the item recommendation rank — 202 aggregating the experience of each user at the moment t to a global experience pool — 203 obtaining an updated policy network based on experiences in the global experience poo — 204

FIG. 2

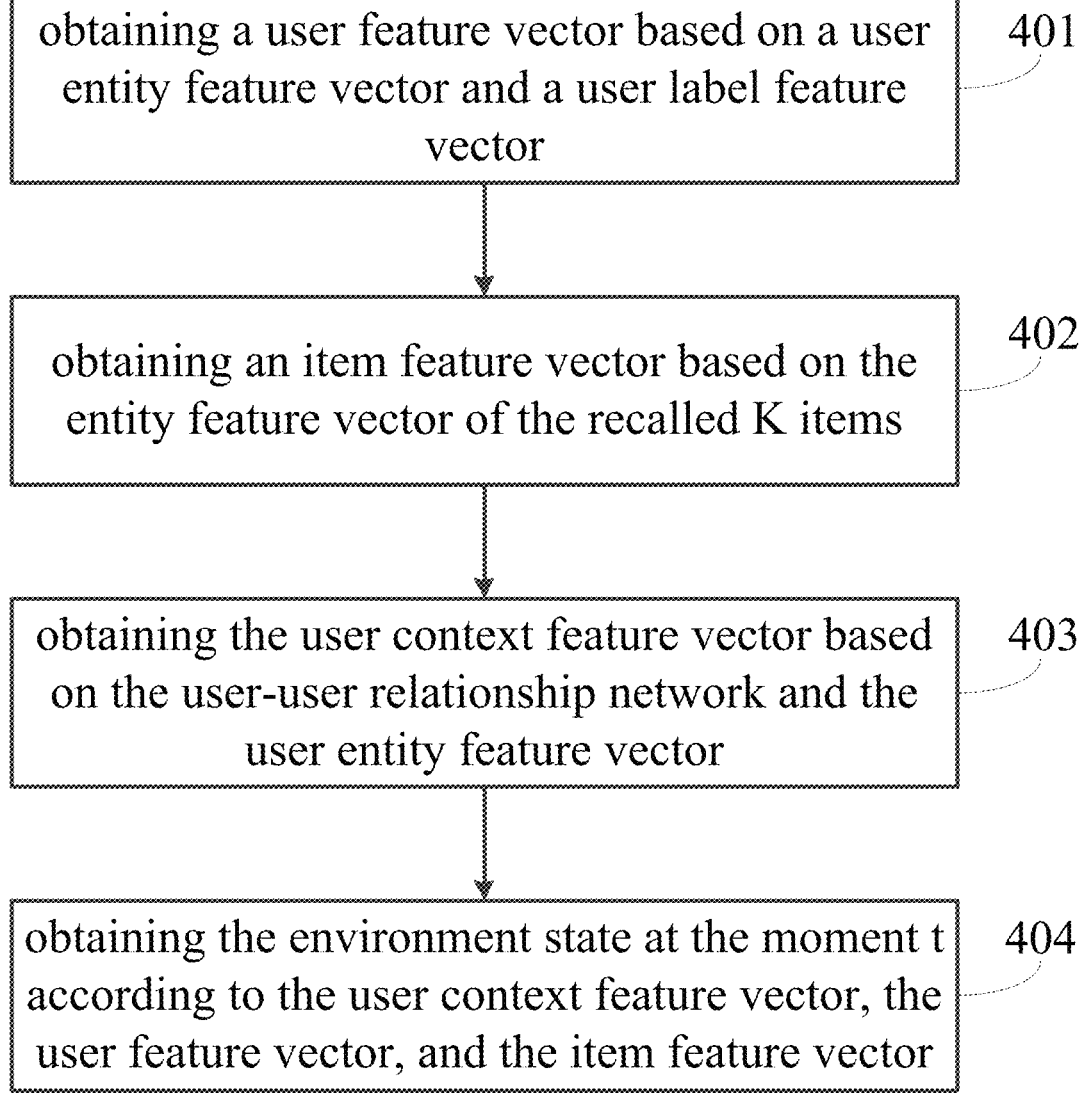

obtaining a user feature vector based on a user entity feature vector and a user label feature vector — 401 obtaining an item feature vector based on the entity feature vector of the recalled K items — 402 obtaining the user context feature vector based on the user-user relationship network and the user entity feature vector — 403 obtaining the environment state at the moment t according to the user context feature vector, the user feature vector, and the item feature vector — 404

FIG. 4

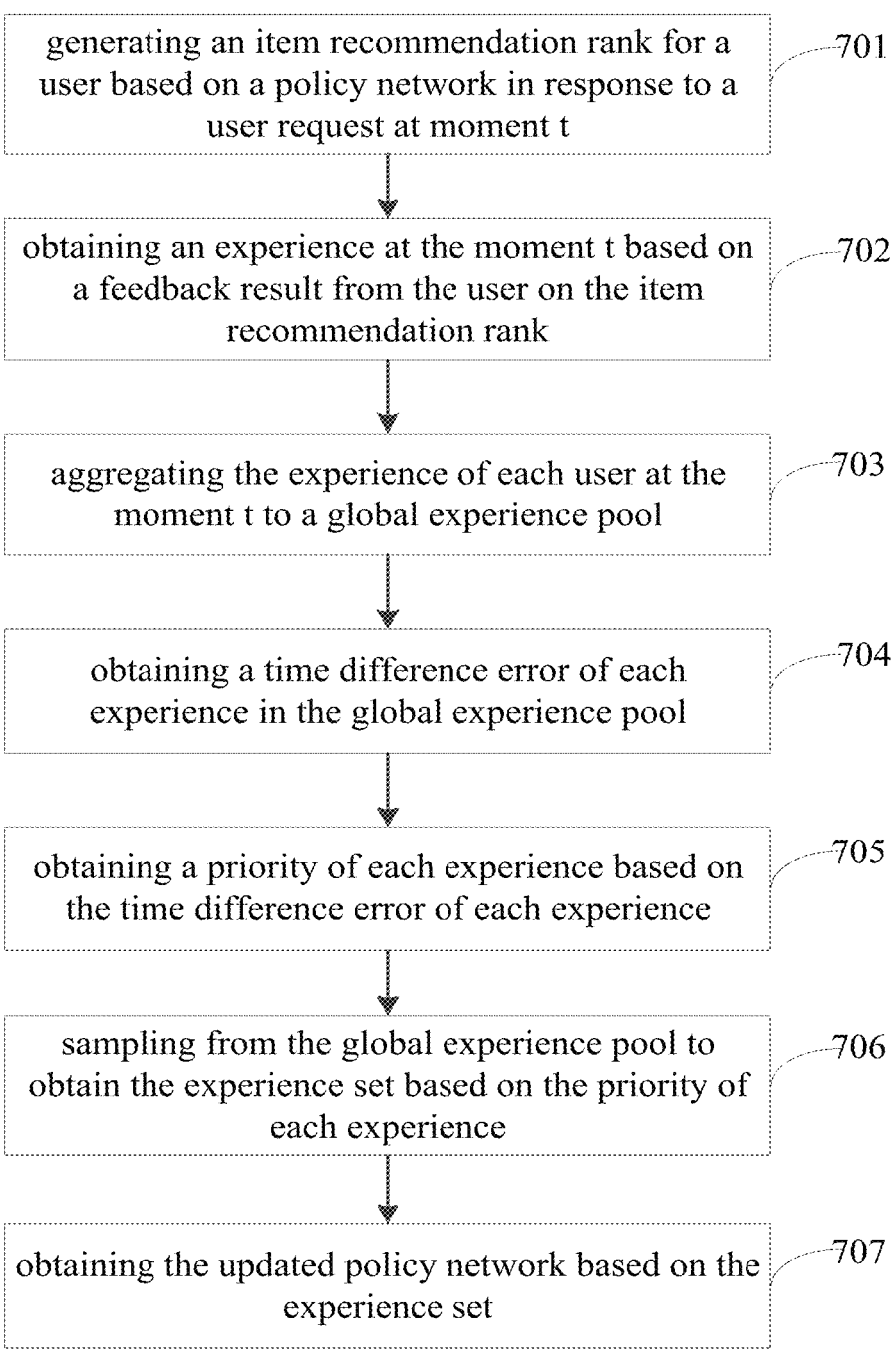

generating an item recommendation rank for a
user based on a policy network in response to a
user request at moment t
701 obtaining an experience at the moment t based on
a feedback result from the user on the item
recommendation rank
702 aggregating the experience of each user at the
moment t to a global experience pool
703 obtaining a time difference error of each
experience in the global experience pool
704 obtaining a priority of each experience based on
the time difference error of each experience
705 sampling from the global experience pool to
obtain the experience set based on the priority of
each experience
706 obtaining the updated policy network based on the
experience set
707

FIG. 7

RECOMMENDATION METHOD, APPARATUS, ELECTRONIC DEVICE, AND STORAGE MEDIUM

CROSS-REFERENCE TO RELATED APPLICATIONS

This application is the National Stage of International Application No. PCT/CN2021/131161, filed on Nov. 17, 2021, which claims priority to Chinese Patent Application No. 202011321668.8, filed on Nov. 23, 2020. The disclosures of the application are incorporated herein by reference in their entireties.

TECHNICAL FIELD

Embodiments of the present application relate to the field of computer technology, and in particular to a recommendation method, an apparatus, an electronic device, and a storage medium.

BACKGROUND

The recommendation system mainly refers to predict the user's preference for an item by obtaining "user knowledge" and "item knowledge", then rank the items according to the preference, and finally feedback the rank results to the user.

However, in traditional recommendation systems, a single policy network actor is used to generate experience to train the policy function, such that the training of the policy function is less efficient.

SUMMARY

The embodiments of the present application provide a recommendation method, including: generating an item recommendation rank for a user based on a policy network in response to a user request at moment t; obtaining an experience at the moment t based on a feedback result from the user on the item recommendation rank; aggregating the experience of each user at the moment t to a global experience pool; and obtaining an updated policy network based on experiences in the global experience pool.

The embodiments of the present application provide a recommendation apparatus, including: an item recommendation rank generation module, configured for generating an item recommendation rank for a user based on a policy network in response to a user request at moment t; an experience acquisition module, configured for obtaining an experience at the moment t based on a feedback result from the user on the item recommendation rank; an experience pool acquisition module, configured for aggregating the experience of each user at the moment t to a global experience pool; and a policy network update module, configured for obtaining an updated policy network based on experiences in the global experience pool.

The embodiments of the present application provide an electronic device, including: at least one processor; and a memory communicated with the at least one processor; the memory stores instructions executable by the at least one processor, the instructions are executed by the at least one processor to enable the at least one processor to perform the recommendation method as mentioned above.

The embodiments of the present application provide a computer readable storage medium storing a computer program, where the computer program, when executed by a processor, implements the recommendation method as mentioned above.

BRIEF DESCRIPTION OF THE DRAWINGS

FIG. 2 is a flowchart of a recommendation method according to the first embodiment of the present application.

FIG. 4 is a flowchart of obtaining an environment state at the moment t according to the first embodiment of the present application.

FIG. 7 is a flowchart of a recommendation method according to a second embodiment of the present application.

DETAILED DESCRIPTION OF THE EMBODIMENTS

In order to make the purpose, technical solutions and advantages of the embodiments of the present application clearer, each embodiment of the present application will be described in detail below in conjunction with the accompanying drawings. However, it will be understood by those skilled in the art that in each embodiment of the present application, many technical details are presented to enable the reader to better understand the present application. However, even without these technical details and various variations and modifications based on each of the following embodiments, the technical solutions protected by the present application can be realized. The following embodiments are divided for the convenience of description and should not constitute any limitation to the specific manner of implementation of the present application, and each embodiment can be combined with each other without contradiction.

A first embodiment of the present application relates to a recommendation method that can be applied to an electronic device such as a server, the recommendation method of the present embodiment includes: generating an item recommendation rank for a user based on a policy network in response to a user request at moment t; obtaining an experience at the moment t based on a feedback result from the user on the item recommendation rank; aggregating the experience of each user at the moment t to a global experience pool; and obtaining an updated policy network based on experiences in the global experience pool. Compared with obtaining experience by using a single policy network, the embodiment can obtain experiences generated by multiple users in parallel and aggregate them into the experience pool, and obtain the updated policy network based on the aggregated global experience pool, which can accelerate the training of the policy network, and also improve the exploration ability, so that the item recommendation rank can meet user needs; the training of the policy network is faster and more efficient, and the exploration ability is improved substantially, so that the item recommendation rank given to the user can meet the user's needs faster. The following is a specific description of the implementation details of the recommendation method of the embodiment, the following is only to facilitate the understanding of the implementation details provided, not necessary to implement this solution. A flowchart of the recommendation method according to the first embodiment of the present application is shown in FIG. 2.

In an embodiment, a knowledge graph is created based on user information and item information before an item recommendation rank is generated for a user based on a policy network.

Figure 1:
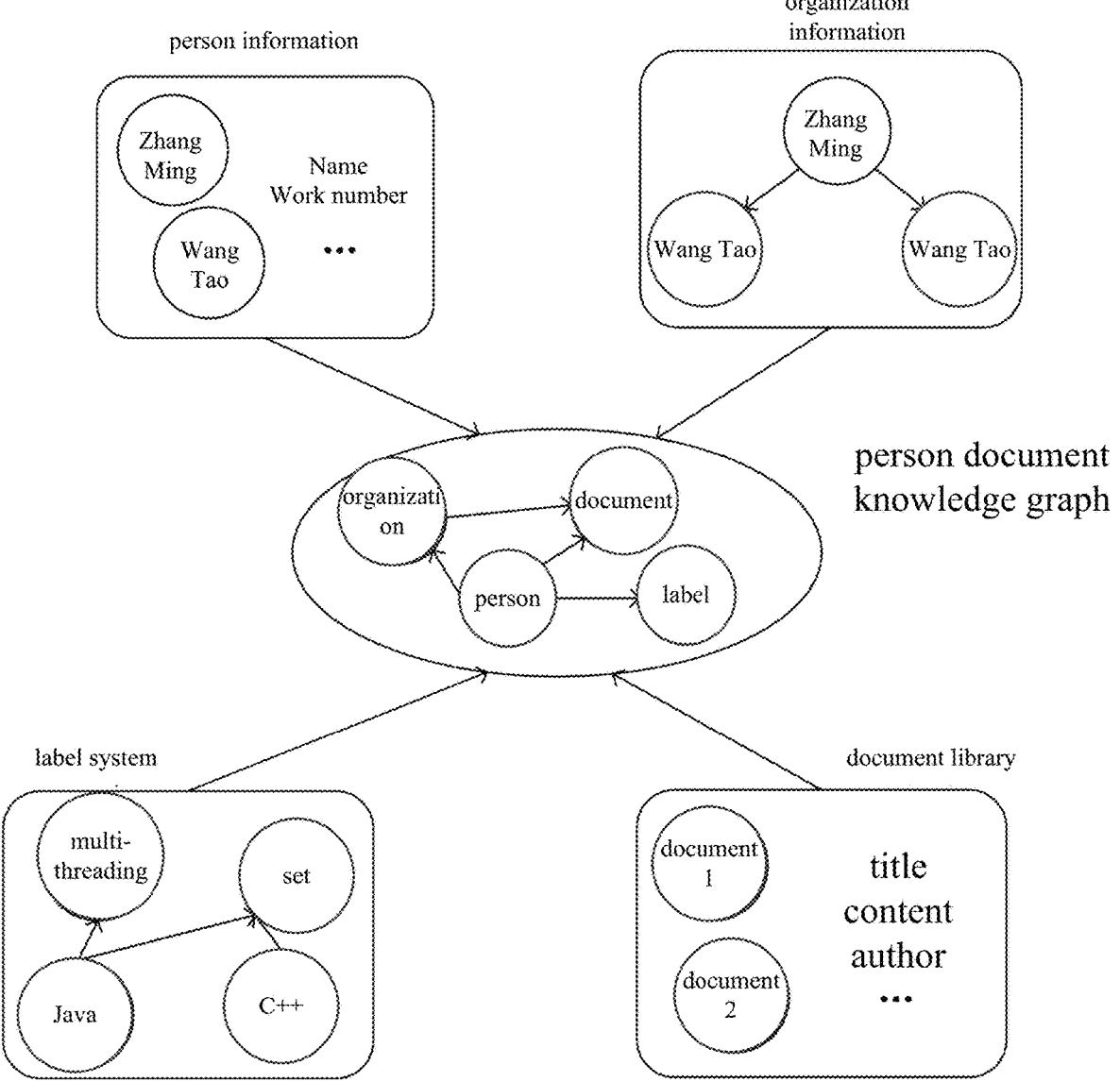
FIG. 1 is a schematic diagram of a knowledge graph of user documents according to a first embodiment of the present application.

Exemplarily, in the case of documents, the knowledge graph is created by first creating entity class, as shown in FIG. 1, the knowledge graph is created based on user information and item information, e.g., a person information class is created by user information, and an organization information class, a label system class, and a document class are created by the item information. The person information: each user can be an entity containing the name, gender, position and other attributes of the user, such as Zhang Ming, Wang Tao and their work numbers, etc. in figures. The organization information represents an organization or a group. The document library mainly consists of documents in each domain, each document can be treated as an entity, and each entity consists of title, content, author and other attributes. The label system mainly classifies and labels individuals and documents, e.g., sets shown in figures, C++, multi-threading, Java. After the entity classes are created, a relationship network of user-user, user-document can be created through the knowledge graph.

In an embodiment, entity feature vectors, such as the item entity feature vector and the user entity feature vector, are obtained based on the knowledge graph and the knowledge graph embedding model. The knowledge graph is introduced into the recommendation system, the knowledge graph serves for creating a relationship network between entities not only for feature learning, but also for providing an association network between users, such that the generated item rank is more relevant to the actual needs of users.

Exemplarily, the knowledge graph embedding model such as TransE, TransH, TransR, etc. is used to generate the entity feature vectors of users, documents, etc. in the above knowledge graph.

The knowledge graph is essentially for creating a relationship network between entities, and semantic search based on the knowledge graph can go beyond the literal statement itself, parse the statement's own structure, and accurately capture the association information inherent in the user's input statement, which can facilitate the user to use the inherent structure and the semantic association between data to perform complex queries and eventually reward exact matching query results.

Step 201, generating an item recommendation rank for a user based on a policy network in response to a user request at moment t.

In an embodiment, obtaining a state of the user at the moment t; obtaining the initial score of the item at the moment t according to the state at the moment t and the policy network; obtaining a weight of the item according to a matching degree between the user and the item; and generating the item recommendation rank based on the initial score at the moment t and the weight of the item.

In an embodiment, the state of the user at the moment t includes: a user feature vector, an item feature vector, and a user context feature vector.

In an embodiment, the user feature vector, the item feature vector, and the user context feature vector at the moment t are obtained based on the entity feature vectors. In the recommendation, not only the user knowledge and item knowledge but also the user context, i.e., friends, are considered, taking into account that people with similar relationships may have similar preferences for certain types of documents, such that the recommended documents are more relevant to user needs.

Figure 3:
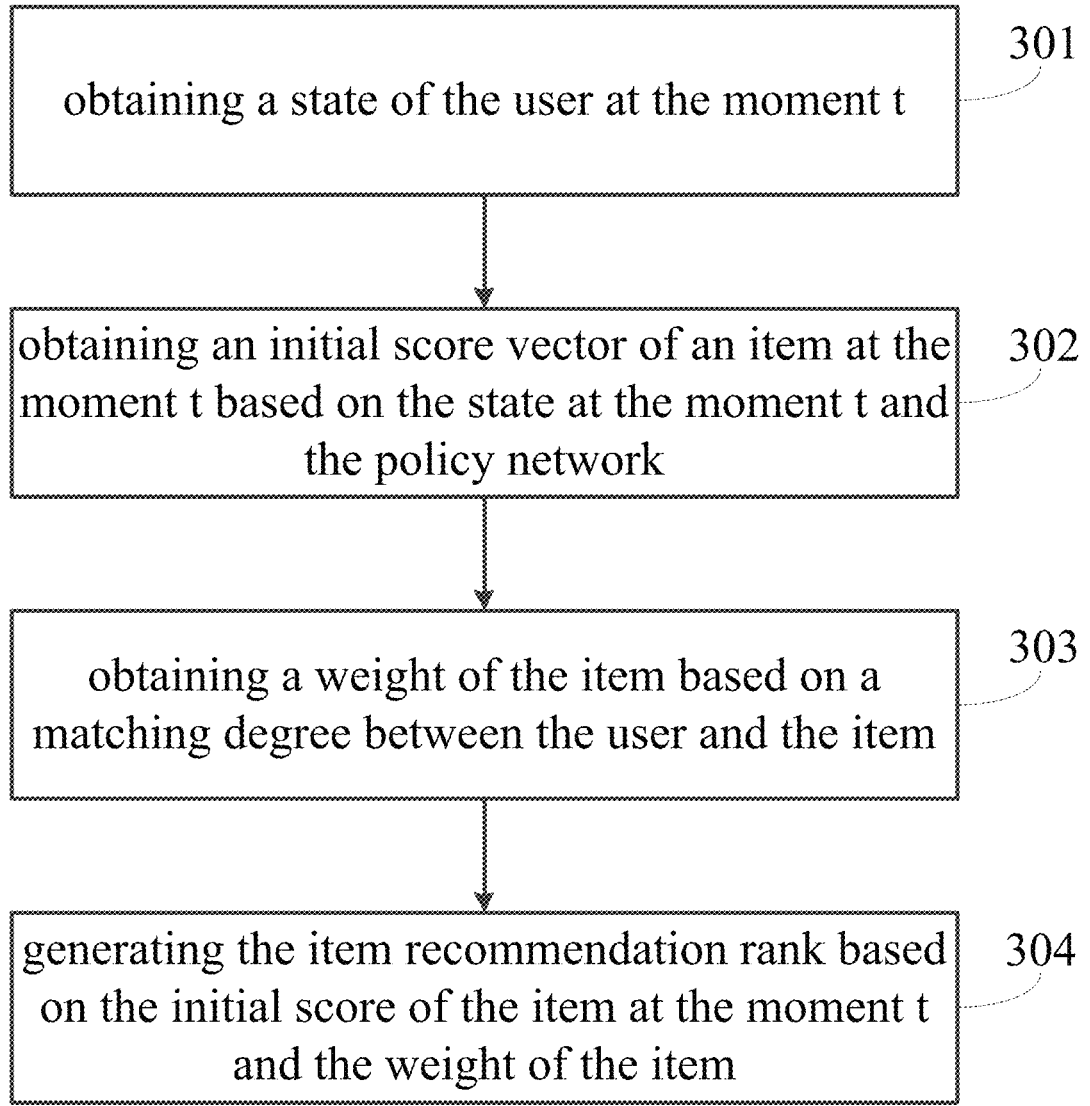
FIG. 3 is a flowchart of generating an item recommendation rank in the recommendation method according to the first embodiment of the present application.

Exemplarily, the flowchart of generating the item recommendation rank for the user based on the policy network in response to the user request at the moment t is shown in FIG. 3.

Step 301, obtaining a state of the user at the moment t. A flowchart of the user obtaining the state at the moment t is shown in FIG. 4.

Step 401, obtaining a user feature vector based on a user entity feature vector and a user label feature vector.

Figure 5:
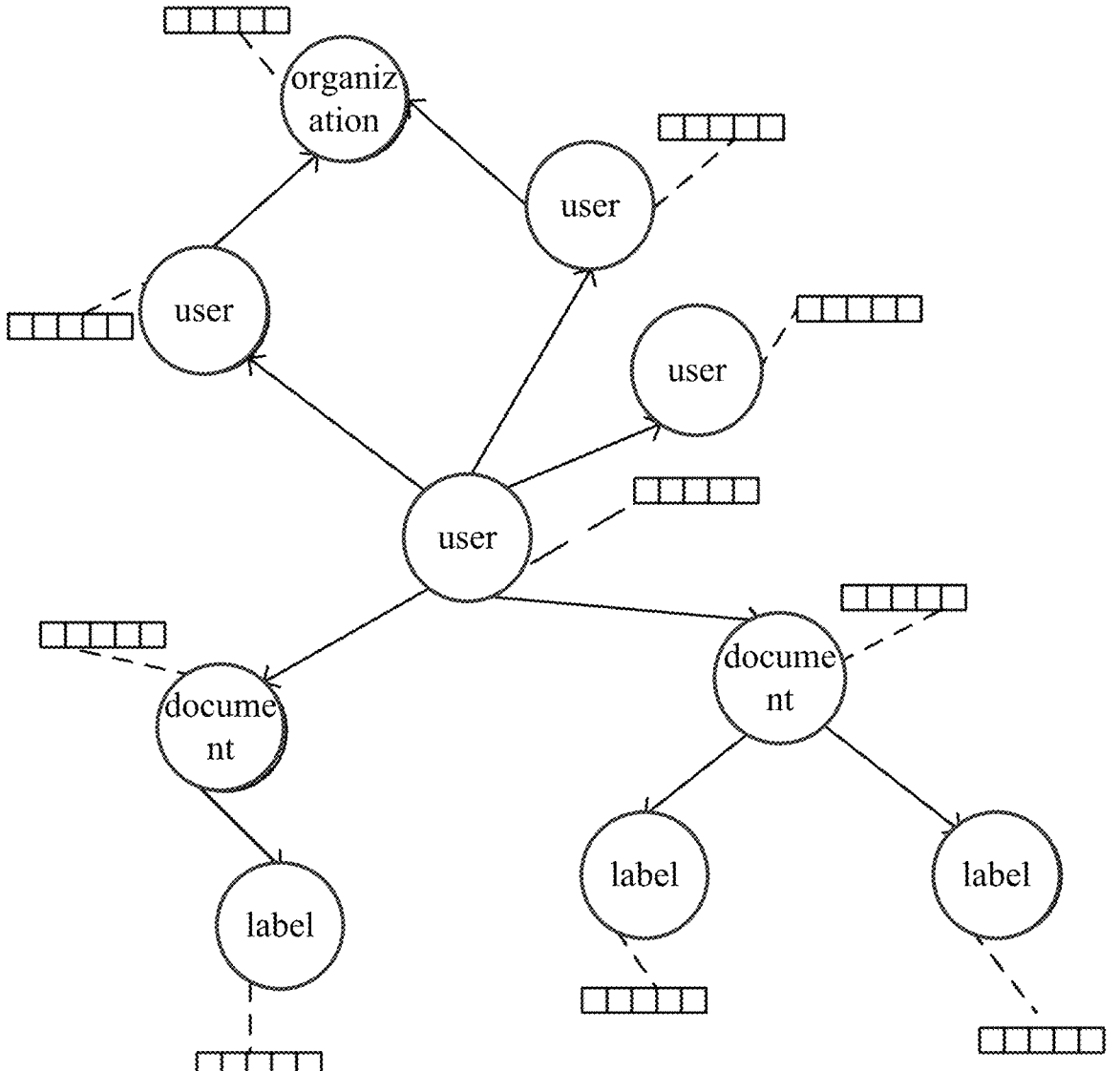
FIG. 5 is a schematic diagram of creating an entity feature vector in a knowledge graph according to the first embodiment of the present application.

Exemplarily, the user feature vector includes the user entity feature vector and the user label feature vector. As shown in FIG. 5, a square connected to an entity with a dashed line in FIG. 5 indicates an entity feature vector of the entity, e.g., a square connected to an organization entity indicates an organization entity feature vector, and a square connected to a user entity with a dashed line in the knowledge graph shown in FIG. 5 corresponds to the user entity feature vector, and a user label corresponding to the user label feature vector mainly refers to a user preference label, and the user label includes an explicit label and an implicit label. The explicit label is the user's self-set label attribute. The implicit label is mainly obtained from the user's behavior buried data, which are mainly divided into two ways, the first way is that according to the labels of the items uploaded by the user, for example, the articles published by the user, the labels of all articles published by the user shown as 601 in FIG. 6, the number of labels is counted, the labels are ranked in ascending order by the number, the first m labels are selected, and the first m labels are converted into a label vector. The second way is that the user labels are obtained based on the history of user browsing items, for example, the variation of user's interest is simulated by the history of user browsing documents, the appearing frequency of document labels corresponding to the user's history browsing documents over a period of time is extracted, the labels whose frequency ranked in the first n are taken as the user's interest labels, and the interest labels are converted into feature vectors.

Step 402, obtaining an item feature vector based on the entity feature vector of the recalled K items.

Exemplarily, the K documents recalled by the search system at a time are converted into corresponding document feature vectors noted as $E_D$ by Embedding techniques, i.e., knowledge graph embedding techniques, such as knowledge graph embedding models, where $E_D=\{e_{D_i}, e_{D_1}, \ldots, e_{D_i}\}$, $e_{D_i}$ represents the ith document feature vector.

Step 403, obtaining the user context feature vector based on the user-user relationship network and the user entity feature vector. The embodiment does not only consider the user's behavior, but also introduces the "friend" feature vector through the relationship network, i.e., the user context feature vector.

Figure 6:
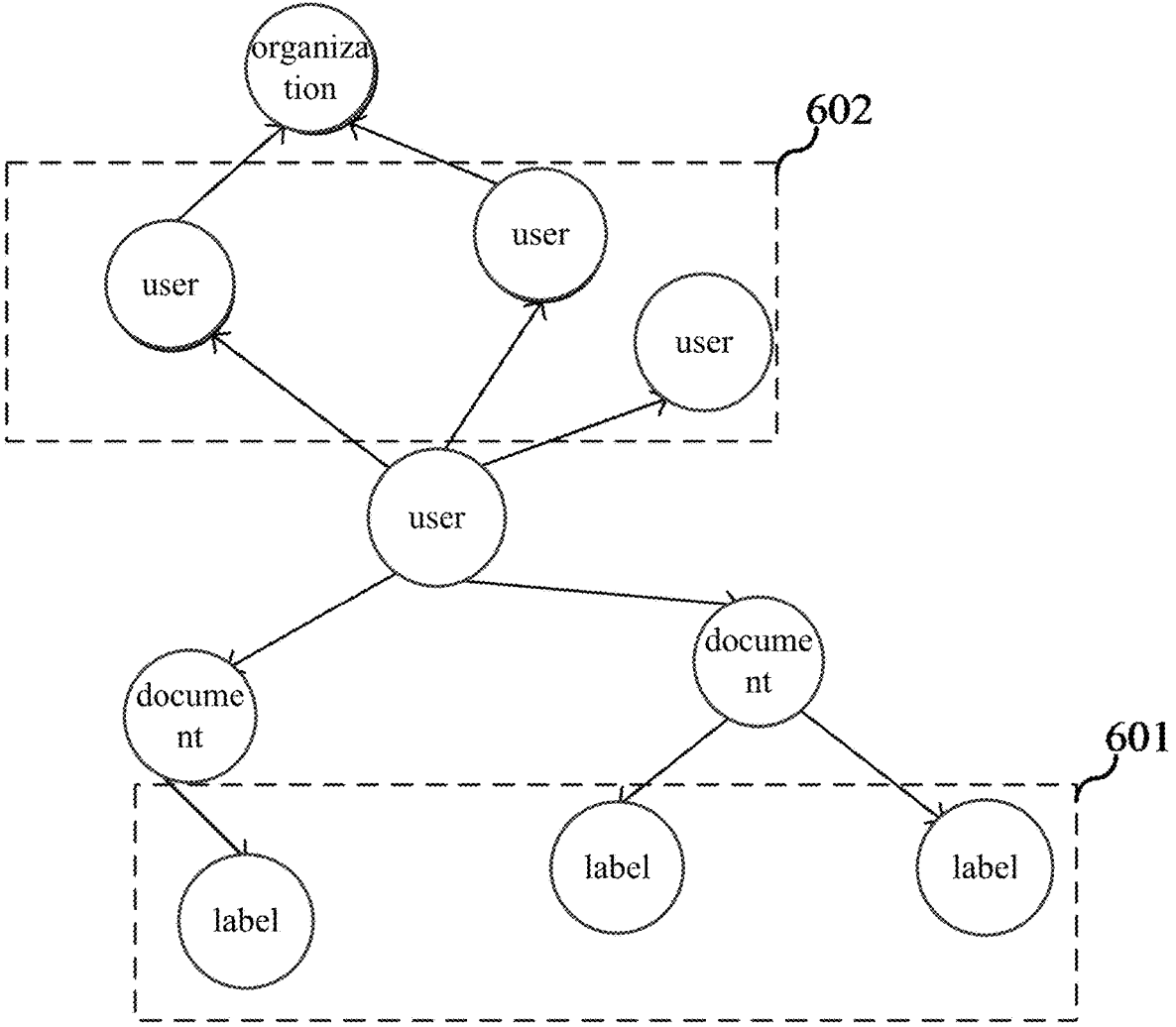
FIG. 6 is a schematic diagram of a relationship network in a knowledge graph according to the first embodiment of the present application.

Exemplarily, 602 shown in FIG. 6 corresponds to the current user's adjacent user entity in the next hop, and $E(e_u)$ is the entity feature vector of the current user $e_u$, Neigh($e_u$) represents a connection node of $e_u$ in the next hop. Two methods to obtain the user context feature vector are given below.

In an embodiment, the mean value of the user's friend feature vector is used to obtain the user context feature vector. In this method, each "friend" entity feature vector has the same weight, and it is impossible to explore the differences of "friends". The mean value of the friend feature vector is $E(\overline{e_u})$, $e_k$ represents any one of the user's "friends", $E(e_k)$ represents the entity feature vector of the "friend", $E(\overline{e_u})$ is calculated as follows:

$$E(\overline{e_u}) = \frac{1}{|Neigh(e_u)|} \cdot \sum_{e_k \in Neigh(e_u)} E(e_k).$$

In another embodiment, the higher the similarity between the friend entity feature and the current user entity feature, the closer the friend is to the user, so that the user context feature needs to be highly taken into account. In the embodiment, the weights are set according to the friend similarity, and the friend similarity is considered from two aspects: first, the weights are set according to the different similarity between the entity feature vector of the friend and the entity feature vector of the current user, and the higher the similarity, it means that the closer the current friend is to the user, the greater the weight will be, so that it needs to be highly taken into account in setting the user context feature vector; second, according to the label similarity between users, the higher the label similarity is, the higher the weight is. In the embodiment, the similarity of users is calculated by the cosine similarity, and finally the user context feature vector is the weighted mean of the "friend" feature vectors.

For example, the similarity $m_{k,\,u}$ between the user k and the user u consists of the cosine similarity of the user entity features and the cosine similarity of the user labels. The entity feature vector of the user u is $O_u$, the set of label feature vectors of the user u is $\{l_{u1}, l_{u2}, \ldots l_{um_u}\}$, $l_{u_i}$ represents the ith label vector of the user u, and $m_u$ represents the number of labels of the user u; the entity feature vector of the user k is $O_k$, the set of label feature vectors of the user k is $\{l_{k1}, l_{k2}, \ldots l_{km_k}\}$, $l_{k_i}$ represents the ith label vector of the user k, and $m_k$ represents the number of labels of the user k. Then $m_{k,\,u}$ is calculated as follows:

$$m_{k,u} = \alpha \frac{O_u \cdot O_k}{\|O_u\|\|O_k\|} + \beta \sum_{i=1}^{m_u} \sum_{j=1}^{m_k} \frac{l_{u_i} \cdot l_{k_j}}{\|l_{u_i}\|\|l_{k_j}\|}, \text{ where } (\alpha, \beta > 0);$$

According to the above formula $m_{k,\,u}$, the similarity between the user k and the user u is obtained, i.e., the weight, and the weighted mean of the "friend" feature vectors is calculated according to the above obtained weights to obtain the user context feature vector, so that the improved formula $E(\overline{e_u})$ is calculated as follows:

$$E(\overline{e_u}) = \frac{\sum_{e_k \in Neigh(e_u)} m_{k,u} \cdot E(e_k)}{\sum_{e_k \in Neigh(e_u)} m_{k,u}}.$$

Step 404, obtaining the environment state at the moment t according to the user context feature vector, the user feature vector, and the item feature vector. In other words, the user feature vector, the document feature vector, and the user context feature vector are merged to become the final environment state at the moment t, i.e., st=(the user feature vector, the document feature vector, the user context feature vector), also noted as, the state space s=(E($e_u$), $E_D$, E($\overline{e_u}$)).

It should be noted that the rank in which the user feature vector, the item feature vector, and the user context feature vector are obtained is arbitrary and the above flowchart does not result in a limitation on the steps in which the user feature vector, the item feature vector, and the user context feature vector are obtained.

Step 302, obtaining an initial score vector of an item at the moment t based on the state at the moment t and the policy network.

Exemplarily, a Deep Q network (DQN) algorithm is used to perform real-time optimization on the ranks of documents. In this algorithm, the output of the Actor is a deterministic policy, i.e. a certain action, the state space s, i.e. the state environment at the moment t, is input to the Actor, and finally the initial rank score vector a of the document is output, the formula is as following;

$$\mu_{\theta^\mu}(s) = a$$

$$a = (a_1, a_2, \ldots, a_k)$$

$$\theta^\mu = (\theta_1^\mu, \theta_2^\mu, \ldots, \theta_m^a);$$

where a is a K-dimensional vector representing an output of the initial rank score at of the K documents, and $\theta^\mu$ is a parameter for the training of the policy network.

Step 303, obtaining a weight of the item based on a matching degree between the user and the item.

Exemplarily, the cosine similarity between the user label and the document label is used as the rank weight of the document, and the greater the similarity between the user label and the document label, the higher the rank weight. The set of label feature vectors of the user u is $$\{l_{u_1}, l_{u_2}, \ldots l_{u_{m_u}}\},$$

$l_{u_i}$ represents the ith label vector of the user u, and $m_u$ represents the number of labels of the user u. The set of label feature vectors of the document $D_d$ is $$\{l_{D_{d,1}}, l_{D_{d,2}}, \ldots l_{D_{d,n_d}}\},$$

$l_{D_{dj}}$ represents the jth label vector of the document $D_d$, $n_d$ represents the number of labels of the document $D_d$, $C_{u,d}$ represents the matching degree, i.e., the similarity, between the user u and the document, the embodiment uses the cosine similarity to calculate, the formula is as following:

$$C_{u,d} = \sum_{i=1}^{m_u} \sum_{j=1}^{n_d} \frac{l_{u_i} \cdot l_{D_{d,j}}}{\left\| l_{u_i} \right\| \left\| l_{D_{d,j}} \right\|}.$$

The above matching degree obtained by using the cosine similarity is used as the weight of the item.

Step 304, generating the item recommendation rank based on the initial score of the item at the moment t and the weight of the item. The item recommendation rank is obtained by combining the initial score and weight obtained from the policy network to make the item recommendation rank more relevant to the actual needs of the user.

Carrying on from the above embodiments, $\lambda_{u,d}$ represents the final score of the document $D_d$ of the user u, the $\lambda_{u,d}$ is expressed with the following formula:

$$\lambda_{u,d} = \frac{C_{u,d} \cdot a_d}{\sum_{i=1}^{k} C_{u,i}};$$

The rank results of final k documents are generated according to $\{\lambda_{u,1}, \lambda_{u,2}, \ldots, \lambda_{u,k}\}$.

Step 202, obtaining an experience at the moment t based on the feedback result from the user on the item recommendation rank.

In an embodiment, the experience at the moment t includes: a state at the moment t, an initial score of an item at the moment t, a reward at the moment t, and a state at moment t+1. The initial score of the item at the moment t is obtained based on the state at the moment t and the policy network; the reward at the moment t is obtained based on the feedback result from the user on the item recommendation rank.

In an embodiment, the feedback result includes: a primary click, a secondary click and a page number in a recommendation page where the item is located; obtaining the reward at the moment t based on the primary click, the secondary click and a preset function. An independent variable of the preset function is the page number in the recommendation page where the item is located, and the preset function represents a variation tendency of the reward at the moment t with a variation of the page number in the recommendation page. The generation of the reward at the moment t takes into account not only whether the user clicks on the document, but also the secondary click of the user, such that the generated reward is more accurate. In addition, the designed preset function indicates the variation tendency of the reward at the moment t with a variation of the page number where the item is located, which simulates the variation of the actual user's operation according to the page number, to further improve the accuracy of the generated reward.

Exemplarily, $C_i$ represents the ith document click, $C_i$ is 1 when the click occurs, otherwise $C_i$ is 0, $D_i$ represents whether the ith document is secondly clicked, $D_i$ is 1 when the secondary click occurs, otherwise $D_i$ is 0, $X_i$ represents the page number in the recommendation page where the document is located, the designed H(x) function represents the variable tendency of the reward with a variation of the page number, the variable tendency of H(x) varies from fast to slow, H(x) meets: H(x)>0, H'(x)<0, H''(x)>0 (x>0), i.e., the first order derivative of H(x) is less than zero, the second order derivative of H(x) is greater than zero. The embodiment sets $$H(x) = \frac{1}{1 + \beta e^x}.$$

$\alpha, \beta$ are coefficients ($\alpha > 0$, $\beta > 0$). Then the sum of the rewards of the K documents is as follows:

$$R = \sum_{i=1}^{k} (C_i + \alpha D_i) \left( 1 + \frac{1}{1 + \beta e^x} \right);$$

The sum of the above k documents is noted as rt, and the rt is the reward at the moment t, and the state of moment t+1 noted as st+1 is obtained after the user operation is completed.

From the above, the state st at the moment t, the initial score at of the item at the moment t, the reward rt at the moment t, and the state st+1 at the moment t+1 are obtained, and the experience (st, at, rt, st+1) at the moment t is obtained.

Step 203, aggregating the experience of each user at the moment t to a global experience pool.

Following the above embodiment, when multiple users query documents online at the same time, each user is assigned an actor, and the actor is responsible for generating document rank for the user and collecting feedback from the user to store (st, at, rt, st+1) as experience in the local experience pool. The experience pool of each actor is aggregated into the global experience pool.

Step 204, obtaining an updated policy network based on experiences in the global experience pool.

In an embodiment, the experience set is sampled from the global experience pool and the updated policy network is obtained based on the experience set, which can enhance the training speed of the policy network.

The recommendation method of the embodiment combines ReinforcementLearning (RL). ReinforcementLearning, also known as augmented learning, is used to describe and solve the problem of an intelligent agent learning a policy to maximize the reward or achieve a specific goal during its interaction with the environment. RL, compared with a traditional machine learning, enables online incremental learning with the following main operational processes: generating decisions based on the current environment state and translating them into actions; changing the current environment and collecting the reward, and performing a decision of the next action according to the itself state, by parity of reasoning, this model is referred to as the "state-action-feedback-state-update" cycle, in which the decision-making capability of the intelligent agent is continuously improved to maximize the reward on a specific goal. The embodiment can continuously improve the fit between the item recommendation rank and the user's own needs in the policy network update.

In the scenario where a single policy network is used to gain experience, some of the recommendation systems use Deep Residual Network (DRN) algorithms to learn and update the recommendation model online in real time, which greatly enhances the use of data in real time compared to other "static" deep learning models. However, the embodiment takes into account that people with similar relationships may have similar preferences for certain types of items, and the DRN algorithm does not include the user's "friend" features in the process of setting the environment state, while the DQN algorithm can include the user's "friend" features. Therefore, the embodiment uses the DQN algorithm to optimize the item rank in real time.

In the recommendation method proposed in the embodiment, in response to the user request at the moment t, the item recommendation rank is generated for the user according to the policy network, the experience at the moment t is obtained according to the feedback from the user on the item recommendation rank, and the experience of each user at the moment t is aggregated to the global experience pool, that is, the experience generated by multiple users is aggregated to the experience pool in parallel, and the policy network is updated according to experiences in the global experience pool. Compared with training the policy network based on the experience of the single policy network, the embodiment makes full use of computing resources and uses multiple policy networks in parallel to obtain the experience, which is faster and more efficient for training the policy network, and substantially improves the exploration capability, so that the item recommendation rank given to the user can meet the user's needs faster.

A second embodiment of the present application relates to a recommendation method, the embodiment is substantially the same as the first embodiment, differing in that: sampling from a global experience pool to obtain an experience set requires obtaining a time difference error of each experience in the global experience pool; the experience set is obtained according to the time difference error. The time difference error is determined based on the reward at the moment t obtained by the feedback result from the user on the item recommendation rank and an expected reward obtained based on the state of the user at the moment t.

The embodiment uses the distributed prioritized experience replay method Ape-x. The Ape-x algorithm uses multiple policy networks to obtain replaymemory data, i.e., experiences, the priority of ranking the replaymemory data is set based on TD-error, i.e., the size of the time difference error, the replaymemory data from each policy network is merged to the global data, and the experience is extracted from the global data for model training, which not only substantially improves the exploration capability, but also prevents overfitting. The flowchart of the second embodiment of the present application is shown in FIG. 7.

Step 701, generating an item recommendation rank for a user based on a policy network in response to a user request at moment t.

Step 702, obtaining an experience at the moment t based on a feedback result from the user on the item recommendation rank.

Step 703, aggregating the experience of each user at the moment t to a global experience pool.

Steps 701 to 703 are substantially the same as in Embodiment 1 and are not repeated herein.

Step 704, obtaining a time difference error of each experience in the global experience pool.

Exemplarily, the time difference error of each experience, i.e. TD-error, is obtained in the global experience pool. The time difference error is determined based on the reward at the moment t obtained by the feedback result from the user on the item recommendation rank and an expected reward obtained based on the state of the user at the moment t.

Step 705, obtaining a priority of each experience based on the time difference error of each experience.

Exemplarily, in the experience pool, the priority is set and ranked according to the size of the TD-error.

Step 706, sampling from the global experience pool to obtain the experience set based on the priority of each experience.

Exemplary, sampling from the global experience pool to obtain the experience set based on the rank result of the priority.

Step 707, obtaining the updated policy network based on the experience set.

Exemplarily, the experience pool data is sampled to train the model, the Actor-Critic network parameters are adjusted and updated and synchronized to each policy function, the training parameters can be increased with noise φ for further increasing the exploration of the intelligent agent.

Figure 8:
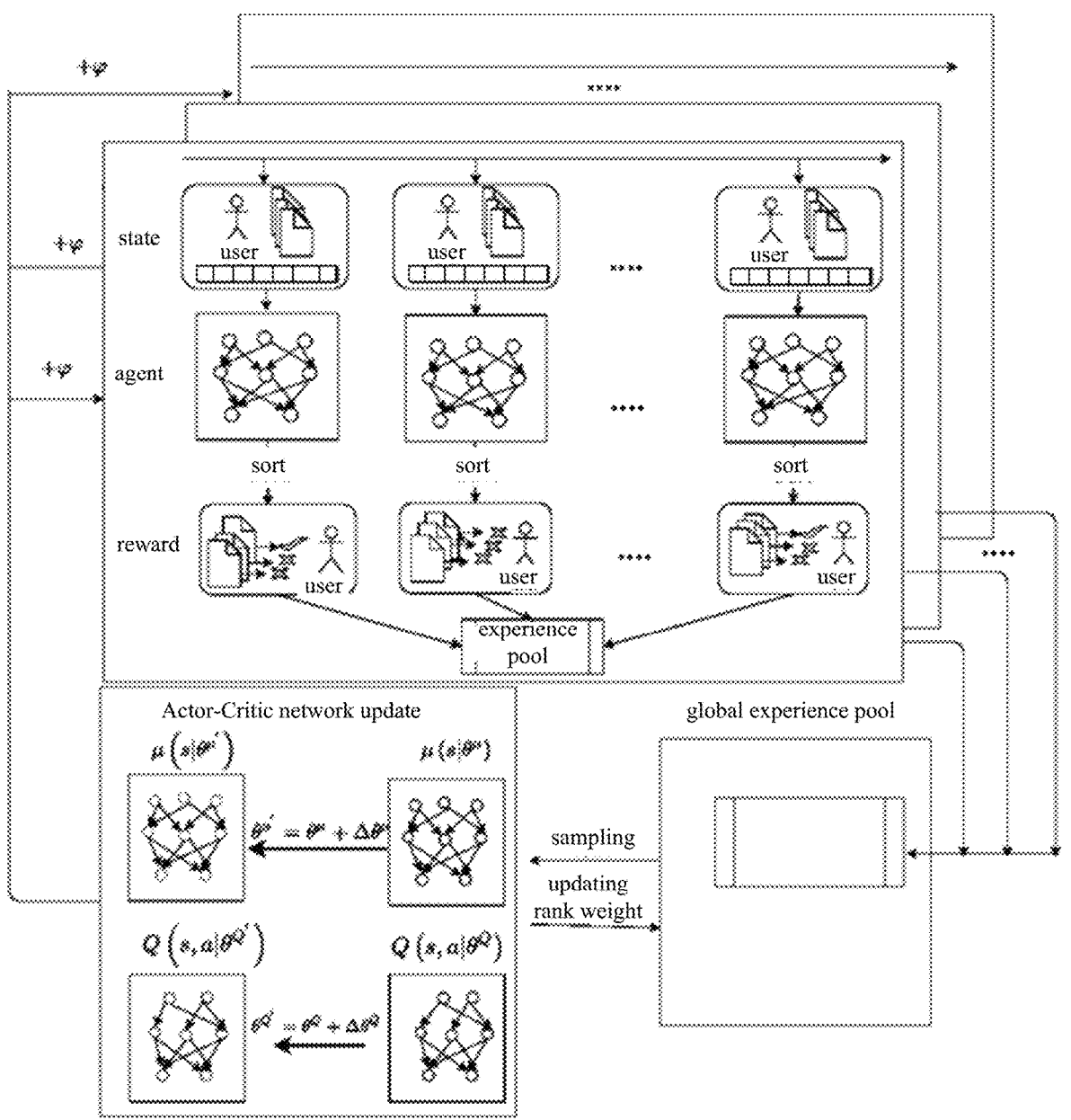
FIG. 8 is a schematic diagram of training a policy network using the Ape-x algorithm according to the second embodiment of the present application.
Figure 9:
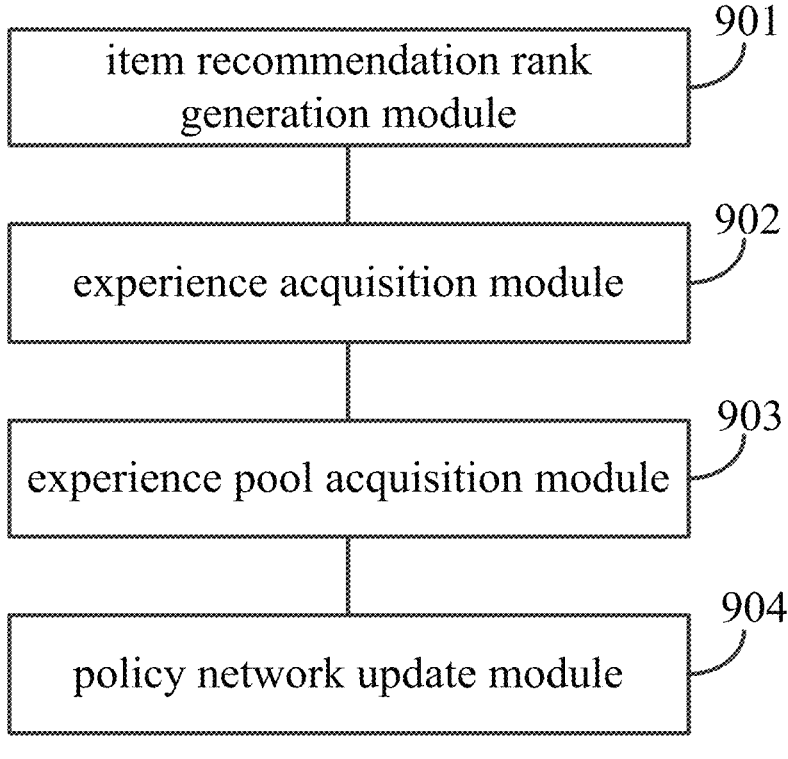
FIG. 9 is a schematic diagram of a recommendation apparatus according to a third embodiment of the present application.

FIG. 8 is a training process of the recommendation method using Ape-x. The environment states generated by each user are input to each policy network, the item recommendation rank is obtained according to the policy network, the user gives feedback on the item recommendation rank to obtain the feedback result, the experience is generated according to the feedback result and stored to the experience pool of each policy function, and then experiences of the experience pool are aggregated to the global experience pool, and according to the rank weight, i.e., the priority, experiences are sampled from the global experience pool to train the Actor-Critic network and to update to each policy network synchronously as the policy for the next round of document rank, which substantially improves the exploration capability and prevents overfitting.

It should be noted that the user label cannot be obtained based on the buried data when the user first sends a search request, at this time the user can be given a label. The user label is obtained, and when the user performs a search, the matching degree between the user label and the item label is calculated to generate an item recommendation rank for the user. The policy network can be initialized according to this method, and for the policy network not start training, the initial rank of the item is consistent by default, and the rank order at this moment is only related to the matching degree between user label and the item label.

The embodiment gets TD_error based on the reward at the moment t obtained by the feedback result from the user on the item recommendation rank and the expected reward obtained based on the state of the user at the moment t, and thus gets the priority, and gets the experience set according to the priority to update the policy network, which enhances the training efficiency of the policy network and enables the parameters of the policy network to converge quickly.

The above division of steps of various methods is only for the purpose of describing clearly, and the implementation can be combined into one step or split for some steps and decomposed into multiple steps, as long as they include the same logical relationship, they are all within the scope of the present application; adding insignificant modifications to the algorithm or process or introducing insignificant design, but not changing the core design of its algorithm and process are all within the scope of the present application.

A third embodiment of the present application relates to a recommendation apparatus, which includes: an item recommendation rank generation module 901, configured for generating an item recommendation rank for a user based on a policy network in response to a user request at moment t; an experience acquisition module 902, configured for obtaining an experience at the moment t based on a feedback result from the user on the item recommendation rank; an experience pool acquisition module 903, configured for aggregating the experience of each user at the moment t to a global experience pool; and a policy network update module 904, configured for obtaining an updated policy network based on experiences in the global experience pool.

In an embodiment, the experience in the experience acquisition module 902 includes: a state at the moment t, an initial score of an item at the moment t, a reward at the moment t, and a state at moment t+1; the initial score of the item at the moment t is obtained based on the state at the moment t and the policy network, and the reward at the moment t is obtained based on the feedback result from the user on the item recommendation rank.

In an embodiment, the item recommendation rank generation module 901 is further configured to obtain a state of the user at the moment t; obtain the initial score of the item at the moment t according to the state at the moment t and the policy network; obtain a weight of the item according to a matching degree between the user and the item; and generate the item recommendation rank based on the initial score at the moment t and the weight of the item.

In an embodiment, the experience acquisition module 902 is further configured to obtain the reward at the moment t based on a primary click, a secondary click and a preset function; an independent variable of the preset function is the page number in the recommendation page where the item is located, and the preset function represents a variation tendency of the reward at the moment t with a variation of the page number in the recommendation page. The feedback result includes the primary click, the secondary click and a page number in a recommendation page where the item is located.

In an embodiment, the experience acquisition module 902 is further configured to obtain the user feature vector, the item feature vector, the user context feature vector at the moment t according to the entity feature vector. The entity feature vector is obtained based on a knowledge graph and a knowledge graph embedding model, the knowledge graph is obtained based on user information and item information.

In an embodiment, the policy network update module 904 is further configured to sample from a global experience pool to obtain an experience set, and obtain an updated policy network based on the experience set.

In an embodiment, the policy network update module 904 is further configured to obtain a time difference error of each experience in the global experience pool; obtain a priority of each experience based on the time difference error of each experience; and sample from the global experience pool to obtain the experience set based on the priority of each experience; the time difference error is determined based on the reward at the moment t obtained by the feedback result from the user on the item recommendation rank and an expected reward obtained based on the state of the user at the moment t.

Not surprisingly, the present embodiment is an embodiment of the system corresponding to the first embodiment, and the present embodiment can be implemented in conjunction with the first embodiment. The relevant technical details mentioned in the first embodiment are still valid in the present embodiment, and will not be repeated here in order to reduce repetition. Accordingly, the relevant technical details mentioned in the present embodiment may also be applied in the first embodiment.

It is worth mentioning that each module involved in the present application is a logical module, and in practical applications, a logical unit may be a physical unit, or a part of a physical unit, or may be implemented as a combination of multiple physical units. In addition, in order to highlight the innovative part of the present application, the present embodiment does not introduce units that are less closely related to solving the technical problem presented in the present application, but this does not indicate that other units do not exist in the present application.

Figure 10:
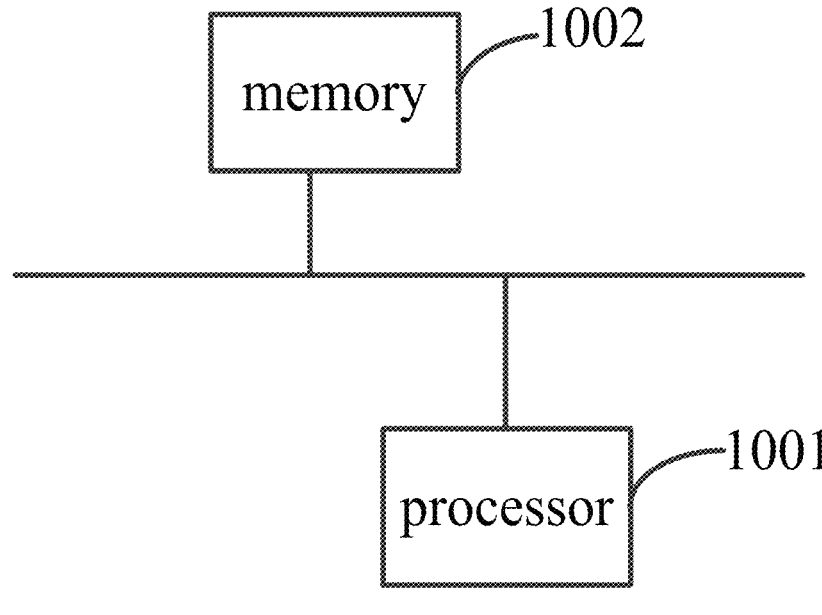
FIG. 10 is a schematic diagram of an electronic device according to a fourth embodiment of the present application.

A fourth embodiment of the present application relates to an electronic device, which includes: as shown in FIG. 10, at least one processor 1001, and a memory 1002 communicated with the at least one processor; the memory stores instructions executable by the at least one processor, the instructions are executed by the at least one processor to enable the at least one processor to perform the recommendation method as mentioned above.

The memory and the processor are connected by a bus, the bus may include any number of interconnected buses and bridges, the bus connecting one or more processors and various circuits of the memory together. The bus may also connect together various other circuits such as peripherals, voltage regulators, and power management circuits, which are well known in the art and therefore will not be further described herein. The bus interface provides an interface between the bus and the transceiver. The transceiver may be one element or a plurality of elements, such as a plurality of receivers and transmitters, providing units for communicating with various other devices on a transmission medium. The data processed by the processor is transmitted over the wireless medium via the antenna, and further, the antenna also receives the data and transmits it to the processor.

The processor is responsible for managing the bus and the usual processing, and may also provide various functions including timing, peripheral interfaces, voltage regulation, power management, and other control functions, and the memory may be used to store data used by the processor in performing operations.

A fifth embodiment of the present application relates to a computer readable storage medium storing a computer program. The computer program, when executed by the processor, implements the method embodiments described above.

That is, it is understood by those skilled in the art that all or some of the steps in implementing the method of the above embodiments can be accomplished by instructing the relevant hardware by a program stored in a storage medium, the program includes a number of instructions to cause a device (which may be a microcontroller, a chip, etc.) or processor to perform all or some of the steps of the method described in the various embodiments of the present application. The aforementioned storage medium includes: a USB flash drive, a mobile hard drive, a read-only memory (ROM), a random access memory (RAM), a disk or a CD-ROM, and various other medium that can store program code.

It will be understood by those skilled in the art that each of the above embodiments is a specific embodiment for realizing the present application, and that various changes can be made to it in form and detail in practical application without departing from the scope of the present application.

What is claimed is:

1. A recommendation method, comprising:
generating an item recommendation rank for a user based on a policy network in response to a user request at moment t;
obtaining an experience at the moment t based on a feedback result from the user on the item recommendation rank;
aggregating the experience of each user at the moment t to a global experience pool; and
obtaining an updated policy network based on experiences in the global experience pool;

wherein the experience comprises: a state at the moment t, an initial score of an item at the moment t, a reward at the moment t, and a state at moment t+1;

wherein the initial score of the item at the moment t is obtained based on the state at the moment t and the policy network, and the reward at the moment t is obtained based on the feedback result from the user on the item recommendation rank;

wherein the feedback result comprises: a primary click, a secondary click and a page number in a recommendation page where the item is located;

obtaining the reward at the moment t based on the feedback result from the user on the item recommendation rank comprises:

obtaining the reward at the moment t based on the primary click, the secondary click and a preset function; and wherein an independent variable of the preset function is the page number in the recommendation page where the item is located, and the preset function represents a variation tendency of the reward at the moment t with a variation of the page number in the recommendation page.

2. The recommendation method according to claim 1, wherein the generating the item recommendation rank for the user based on the policy network in response to the user request at the moment t comprises:

obtaining a state of the user at the moment t;

obtaining the initial score of the item at the moment t according to the state at the moment t and the policy network;

obtaining a weight of the item according to a matching degree between the user and the item; and generating the item recommendation rank based on the initial score at the moment t and the weight of the item.

3. The recommendation method according to claim 2, wherein before the generating the item recommendation rank for the user based on the policy network in response to the user request at the moment t, the recommendation method further comprises:

obtaining an entity feature vector based on a knowledge graph and a knowledge graph embedding model, wherein the knowledge graph is obtained based on user information and item information;

the state of the user at the moment t comprises: a user feature vector, an item feature vector, a user context feature vector; and the obtaining the state of the user at the moment t comprises:

obtaining the user feature vector, the item feature vector, the user context feature vector at the moment t according to the entity feature vector.

4. The recommendation method according to claim 1, wherein the obtaining the updated policy network based on the experiences in the global experience pool comprises:

sampling from the global experience pool to obtain an experience set; and obtaining the updated policy network based on the experience set.

5. The recommendation method according to claim 4, wherein the sampling from the global experience pool to obtain the experience set comprises:

obtaining a time difference error of each experience in the global experience pool;

obtaining a priority of each experience based on the time difference error of each experience; and sampling from the global experience pool to obtain the experience set based on the priority of each experience;

wherein the time difference error is determined based on the reward at the moment t obtained by the feedback result from the user on the item recommendation rank and an expected reward obtained based on the state of the user at the moment t.

6. An electronic device, comprising:

at least one processor; and a memory communicated with the at least one processor;

wherein the memory stores instructions executable by the at least one processor, the instructions are executed by the at least one processor to enable the at least one processor to perform the recommendation method according to claim 1.

7. A non-transitory computer readable storage medium storing a computer program, wherein the computer program, when executed by a processor, implements the recommendation method according to claim 1.

* * * * *